Figure 1:
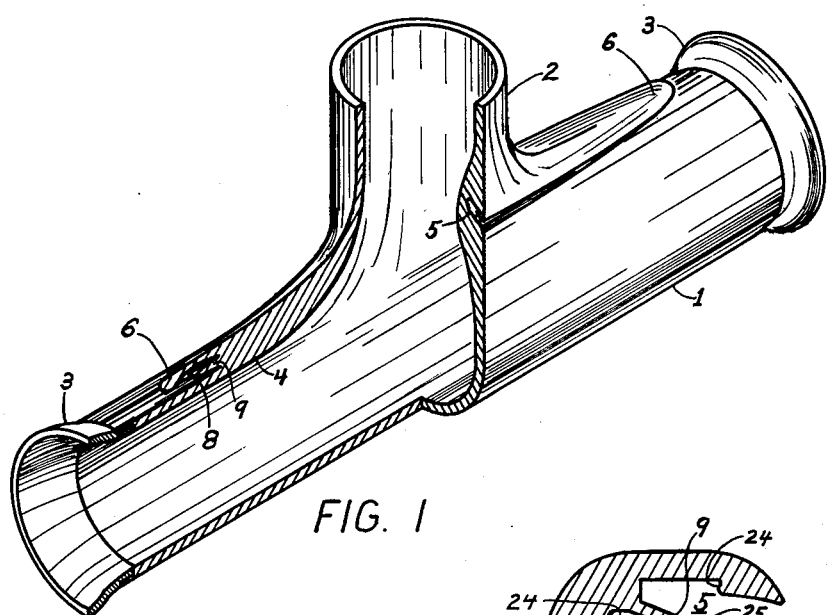

Dec. 5, 1961    J. W. JORDAN    3,011,502
SLIDING CONNECTORS

Filed March 10, 1960    3 Sheets-Sheet 1

INVENTOR.
John W. Jordan
BY

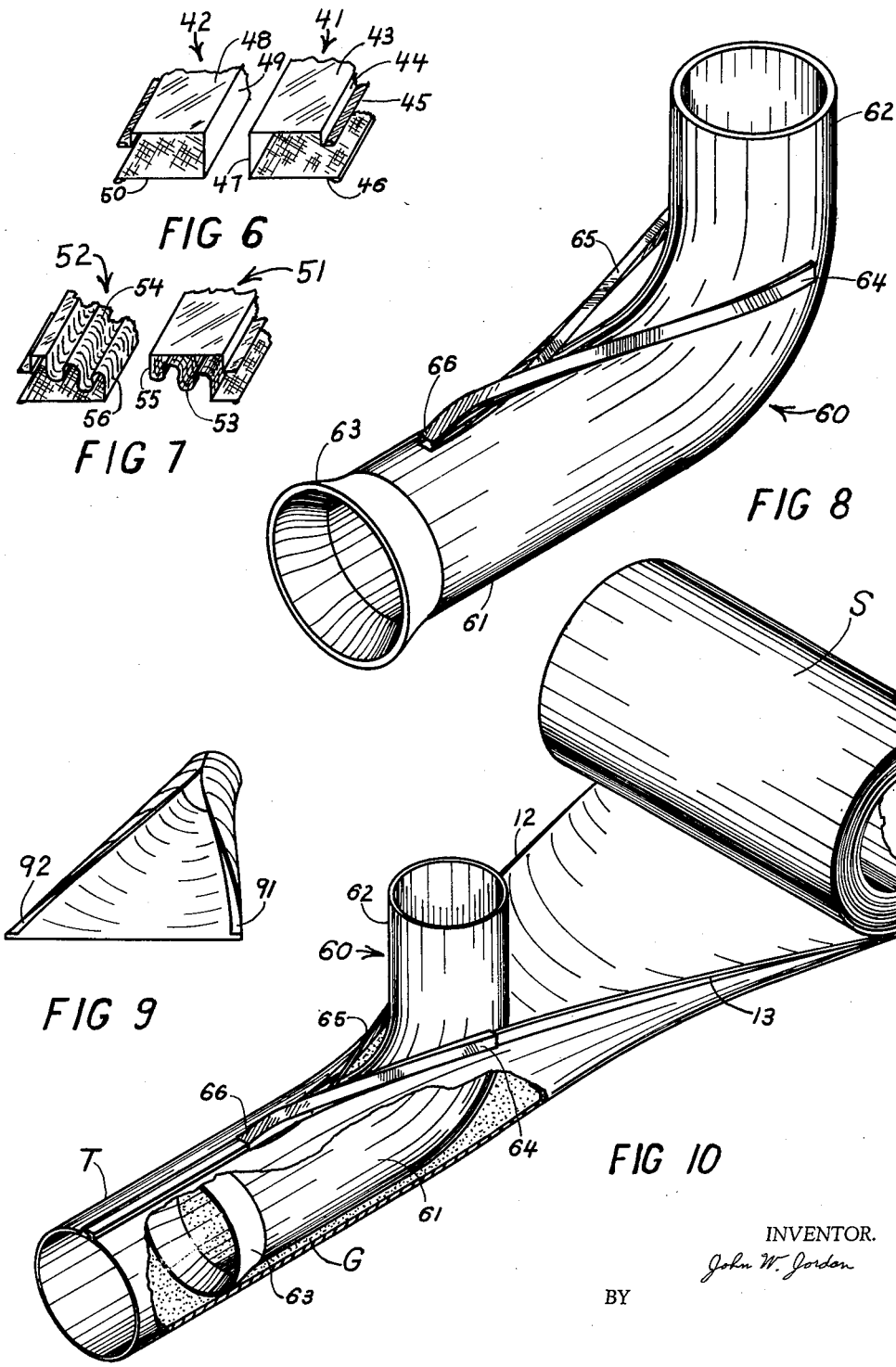

Dec. 5, 1961  J. W. JORDAN  3,011,502
SLIDING CONNECTORS
Filed March 10, 1960  3 Sheets-Sheet 3

INVENTOR.
John W. Jordan
BY

United States Patent Office 3,011,502
Patented Dec. 5, 1961

3,011,502
SLIDING CONNECTORS
John W. Jordan, 3658-B Arizona Ave.,
Los Alamos, N. Mex.
Filed Mar. 10, 1960, Ser. No. 14,016
11 Claims. (Cl. 137—1)

The present invention deals with means for distributing fluid materials and any solid materials which can be forced or carried through a conduit, and is more particularly concerned with means for continuously distributing such materials from a tubular conduit of a pliable resilient material over the entire length of such a conduit.

The present invention was conceived as an aid in the distribution of water on arid land. In many parts of the world there are vast stretches of fertile land which lack sufficient natural rainfall, and need only irrigation to be transformed from desert into oasis. Such lands are more and more being reclaimed and put to the plow through irrigation. Many worthwhile devices have been developed and adapted to this purpose, including deep wells to reach the underlying water table, pumps to bring the water to the surface, and self-propelled "irrigators" to project the water through the air so forcibly as to moisten a surface area several hundred feet in diameter.

The present invention is particularly useful in conjunction with such irrigators, which must somehow be supplied with water. An irrigator is simply an automotive vehicle on which is mounted a water pump and a nozzle, the output of the pump being connected to the nozzle. Various means have heretofore been used to supply water to the input side of the pump. It is not at all uncommon to utilize a system of open ditches and a hose trailing from the pump so that its free end is immersed in and is dragged through the water filling the ditch. Such a system has many disadvantages, including abrasion to the hose and the entry of mud, sand, and other unwanted material with the water; despite the use of screens and filters, a portion of such undesirable matter is carried into the pump to shorten its useful life. Open ditches are also prodigal of water, through percolation and evaporation, require considerable labor to build and maintain, and present a problem in the movement of machinery from one side to the other. Where a spot in the ditch is crossed infrequently, many types of machinery can be pushed or propelled across, but at the cost of hard wear on both machinery and ditch. Where the ditch receives heavy traffic or the machinery is not readily adaptable to such crossings, e.g., ordinary passenger automobiles, a culvert must be built and maintained. Ditch systems are also limited to reasonably flat ground, and little or no hydrostatic pressure can be maintained in them.

Other irrigation systems may make use of fixed piping with a number of nozzle outlets and adequate pumping facilities for the necessary pressure, the entire system being designed to water a specific tract of ground without the use of moving irrigation equipment. Such systems, however, are quite expensive to install and maintain, and highly expensive to relocate. They are subject to corrosion from within and without, even during the idle winter months when they have no productive uses.

My invention is directed towards means for improving the first type of irrigation system mentioned above, the distribution of water from an irrigator. It is the primary object of my invention to eliminate the above listed disadvantages accompanying the use of such an irrigator with a network of open ditches. In considering this problem, I reasoned that the bulk of such disadvantages would disappear if the ditches could be eliminated and the water distributed to the irrigator from a pipe system lying on the surface of the earth. While it was apparent that a pipe system in which the members are open at the top to form a trough could be utilized to eliminate many of the defects of the ditch system, it was equally apparent that many disadvantages would remain. It appeared to me to be necessary to use a system of closed pipe, together with a means slidable within such pipe and having an extension protruding to the outside for fluid connection to a conduit extending from the intake of the pump mounted on the moving irrigator. Since it was desirable to have the protruding extension move through the closed pipe wall as the irrigator moves along the pipeline, it became necessary to consider means for opening a pipe just ahead of the slidable means and closing it just after the passage of the protruding extension, such opening and closing to be continuous and without appreciable leakage. Alternately, the requirement that water be delivered from a device moving continuously along a pipe could be met by propelling the device forming the pipe by the device itself and also using it to prevent any leakage of water into the unformed material from which the pipe is given its shape.

Figure 2:
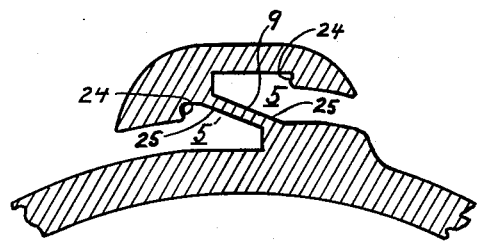
Figure 3:
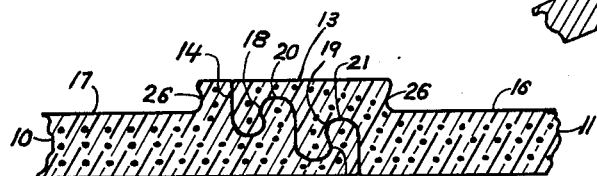
Figure 4:
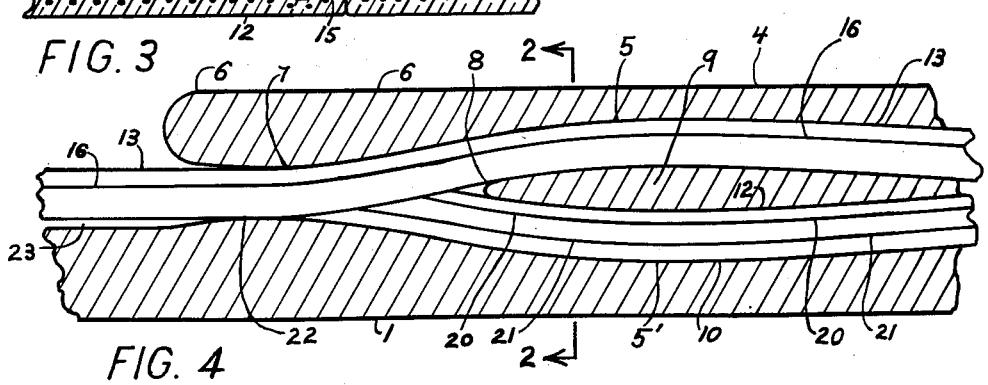
Figure 5:
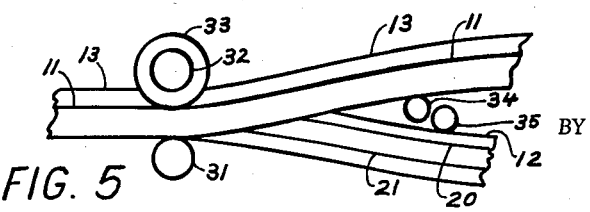

My invention may be more easily understood by referring to the accompanying drawings, in which FIGURE 1 is a perspective view of one embodiment of the present invention, a T connector, with one of the foreground quarters removed, FIGURE 2 is a cross section of the FIGURE 1 embodiment transverse to the longitudinal axis, taken at a point near the merging of the tubing grooves, as indicated by lines 2—2 of FIGURE 4, FIGURE 3 shows the preferred configuration of tubing edges for use with the present invention, FIGURE 4 is an enlarged partial view of the longitudinal cut made in the FIGURE 1 embodiment, indicating the merging of the tubing grooves and showing the tubing edges disposed therein, FIGURE 5 indicates a means of joining and separating tubing edges by rollers, FIGURE 6 illustrates a pair of guide strips for tubing edges which may be used in conjunction with a connector body to provide the necessary tubing grooves, FIGURE 7 is an alternate form of guiding strip, fabricated to conform more closely to the preferred form of tubing edges of FIGURE 3, FIGURE 8 is another embodiment of the present invention, an elbow type connector, illustrated with the guide strips of FIGURES 6 and 7, FIGURE 9 shows a member which may be used to form tubing form flat sheet stock, FIGURE 10 illustrates the use of the FIGURE 8 embodiment in forming tubing from a roll of flat sheet stock.

Figure 11:
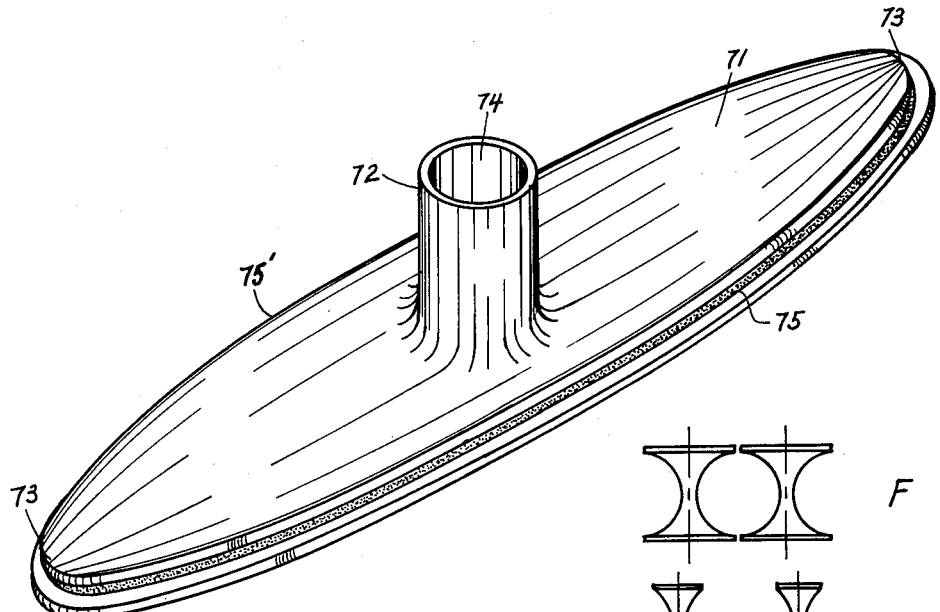
Figure 12:
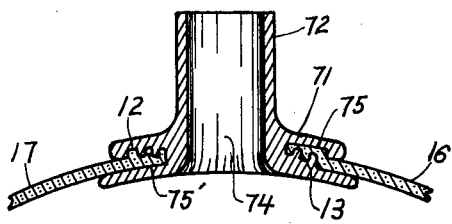
Figure 13:
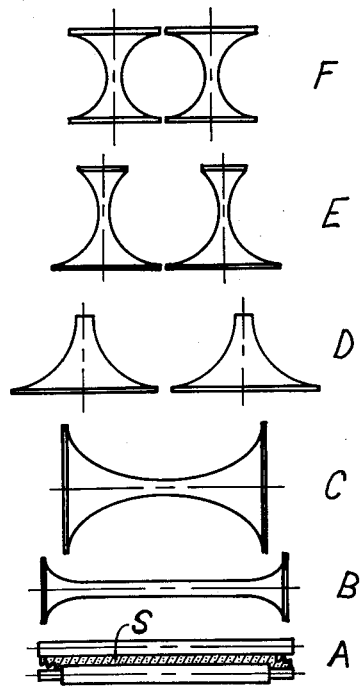
Figure 14:
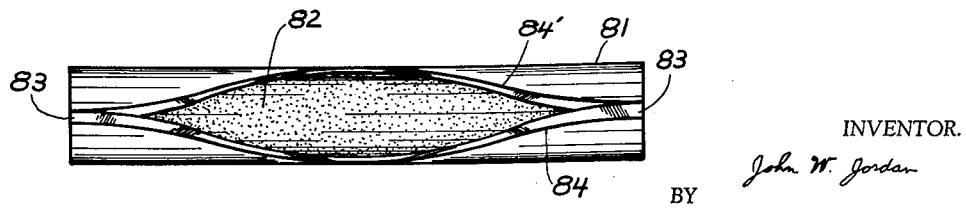

FIGURE 11 is a third embodiment of the present invention, a reducing T connector, FIGURE 12 is a vertical transverse cross section of the FIGURE 11 embodiment through the axis of the upright outlet, showing the tubing edges as held in the grooves, FIGURE 13 indicates a series of rolls that may be used to form fairly rigid flat sheet stock into tubing, and FIGURE 14 is an auxiliary device that may be used with the embodiments of FIGURES 1 and 11 to replace the rabbeted or cast grooves thereof.

In considering the problem outlined above, I directed my attention to slide fasteners, especially the type of slide fastener used to join and separate the beaded and grooved edges of sheet material, in particular sheets of resilient materials such as plastics, rubber and the like. Many excellent examples of such slide fasteners are shown in the prior art and are commercially available, as are a wide variety of suitable plastics for use in conjunction therewith, including plastics containing various fillers and fibres such as glass, asbestos, and metals. Such plastic sheets are available in long rolls and a variety of strip widths, both edges of the strip being properly beaded to cooperate with each other and with the standard slide fastener to form a tube.

Such prior art slide fasteners are not, however, adaptable to the purposes of my invention. They serve only to join two strip portions when moved in one direction, and to separate the same strip portions when moved in the opposite direction. Except when being so moved, such a slider or slide fastener serves no purpose at all, and can be removed from the assembly until needed again to serve its fastening or unfastening function. A typical such fastener, viewed from the end where the separated beaded edges enter the fastener, appears as a modified S of a rather mechanical shape, as illustrated in Kidd, U.S. Patent 2,756,172, FIGURE 5. There are three parallel horizontal crossbars of about equal width and equally spaced from each other, a left hand vertical bar joining, e.g., the top crossbar with the center and a right hand vertical bar joining the center crossbar with the bottom crossbar. In addition, there is a vertical bar extending from the right end of the top crossbar towards the center crossbar but terminating sufficiently short thereof to define a slot which will accommodate the thickness of the main portion of the plastic sheet but not its beaded edge, and a corresponding vertical bar extending from the left end of the bottom crossbar almost to the center crossbar to define a slot of the same thickness. The beaded portions of the plastic strips, are, of course, inserted in the larger gaps between the parallel crossbars with the thinner main body portions extending out through the smaller slots, the top strip extending to the right and the bottom strip to the left. They are inserted in mating relationship, with the ridge portions of one beaded edge disposed above the groove portions of the other and vice versa.

A view from the opposite end of such a slide fastener, also referred to in the prior art as a "slider," "shoe," "runner," etc., reveals a single rectangular slot of approximately the same width as between the vertical bars on the opposite end and somewhat greater height than between any two adjacent crossbars of the opposite ends, and a pair of small slots of a height to accommodate the main body of plastic sheet connecting the larger slot to the outside, one extending to the right and the other to the left. In the interior a rather blunt horizontal edge may be discerned at about the middle of the slot. This edge is, of course, the other end of the center crossbar seen from the opposite end of the slide fastener. This element is tapered so that the two larger slots, which accommodate the beaded edges of the plastic strips, become a single slot at the joining end of the slider, forcing such beaded edges into mating relationship and thereby completing the joint or fastening. Such a view may be discerned from FIGURE 5 of Madsen, U.S. Patent 2,613,421, which is a cross section looking toward the single opening end of his slider. Madsen's FIGURE 3 also illustrates the function of the tapering center crossbar and the converging upper and bottom crossbars in forcing the beaded edges of the sheets into interlocking reltationship.

As noted above, the principal disadvantage of such prior art slide fasteners for the purposes of the present invention is their limitation to opennig and closing functions. I conceived that slide fasteners or sliding connectors could be constructed in which, during movement in one direction, one end would serve an opening function and the other a closing function, leaving an initially closed fastening in the same condition after the passage of the connector. Intermediate the two ends, there is no necessity for retaining the separated edges of the material close to one another, and the connector body may include a conduit portion extending transversely between such edges for the passage of fluids. With the edges of the material being initially joined from a single sheet to form a tube, such a connector in moving through the tube furnishes a means for the continuous distribution of a fluid from the interior of the tube. This is accomplished by disposing the edge closing and opening structures on the surface of a T connector, which may have a continuous passage therethrough to which a passage within the transverse conduit member is joined, in which case reliance is placed on the greater pressure of the fluid within the pipe to distribute such fluid from the transverse member as the connector passes along the tube. Alternately, one end of the tube may be partially or completely blocked so that a portion or all of the fluid passing into the connector will be pumped out through the transverse member.

I also conceived that similar sliding connectors could be built to simultaneously distribute a fluid and form the tube in which the connector is moved. In such a connector, one end of the tube moves into a sheet of tubing, separated grooves being provided in the connector surface to engage the beaded edges of the tubing material. These grooves maintain the tubing edges in such separated state as they pass the transverse conduit portion of the connector, and thereafter such grooves converge to force the tubing edges into interlocking relationship. The other end of the connector, which slides through the thus formed tubing, must necessarily conform closely to the inside circumference of the tubing to provide a seal between connector and tubing.

Turning now to the drawings, FIGURES 1–4 illustrate the T connector embodiment of the present invention, consisting of a tubular body 1, transverse conduit portion 2, and flared ends 3. All three parts may be of metal, as shown, or other releatively rigid material. Ends 3 may also be fabricated of a stiff thickness of rubber, the flared members expanding slightly under fluid pressure to provide good seals. The preferred construction of this embodiment is one in which body 1 and transverse conduit portion 2 are integral and have a thicker wall portion 4 near their joint than the walls at other parts of the connector. The central wall portion 4 has a pair of oppositely disposed grooves 5 and 5' cast or machined therein, only the near groove 5 appearing in FIGURE 1, the left hand or distant groove 5' following substantially the same course on the opposite surface of the thickened wall portion 4. Each groove 5 or 5' is disposed to follow a course from a joint beginning with its mating groove at an end 6 of enlarged portion 4, where it lies just above the surface of body 1, to fully opened position at essentially the full radius of body 1, in which position it is somewhat higher than before. It is alsc to be noted that it is preferable to rotate each groove 90° from its starting position, as shown, to insure against shart bends in the tubing, which may eventually cause rupture.

FIGURE 4, which is an enlarged partial view of the longitudinal cut of the FIGURE 1 embodiment, shows the manner in which the beaded edges of tubing are joined and separated, the grooves 5 and 5' being shown with such beaded edges in place but unsectioned in the interest of simplicity. For further simplification, grooves 5 and 5' and tubing edges 12 and 13 are shown in full maximum height, it being understood that such grooves and edges diverge horizontally in proceeding to the right, 5' and 12 to the rear and 5 and 13 to the front. Tubing edges 12 and 13 are separated initially by vertically displacing one relative to the other until the interlocking ridges and grooves are separated, and this is accomplished as shown in FIGURE 4 by raising near groove 5 and lowering distant groove 5' from their common initial position 7. The blunt nosed end 8 of transverse member 9 forces the beaded edges 12 and 13 of strips 10 and 11 to separate and follow grooves 5 and 5' as the connector is moved to the left. In the opposite or joining movement, engagement is aided by the enlarged thickness of end 6 of enlarged body portion 4 shown at position 7.

FIGURE 4 shows the beaded edges 12 and 13 of the preferred type of tubing joint of FIGURE 3 disposed in place in the grooves 5 and 5' of the connector. Tubing edge 13 of strip 11, having downwardly extending ridges 14 and 15 and upwardly extending grooves therebetween, is raised relative to edge 12, having upwardly extending ridges 18 and 19, to effect a separation, this being accomplished in the embodiment of FIGURES 1–4 by lowering distant groove 5' gradually and raising near groove 5 a like amount. The reference characters 20 and 21 represent the crests of upwardly extending ridges 18 and 19, respectively.

It is to be noted, in connection with FIGURE 4, that the interlocked tubing edges shown at the left do not touch the body 1 of the connector, but enter a slightly raised portion 22 thereof at the beginning of the grooves 5 and 5' to define a gap 23. This has been found to be desirable to prevent excessive surface contact between the connector and the tubing, as such contact increases the friction therebetween and increases the force which must be applied to the connector by the propulsion means. In the preferred embodiment, the only contact between tubing and connector other than at 22 is at the two ends 3, which is a circumferential line contact, and the contact between the tubing edges and grooves 5 and 5'. The gap 23 extends around the full circumference of connector body 1, and grooves 5 and 5' are disposed to define a similar gap between the bottom of the connector in thickened section 4 and the tubing of appropriate size.

Although not shown in the figures, the conduit portion 2 of the T connector is attached to an irrigator or other propelled vehicle by any conventional conduit connecting means, e.g., a pipe extending from such irrigator and fastened to conduit portion 2 with an elbow joint. When the main passage of the connector is unblocked, it is ideally fitted for operation with a reinforced plastic tube already filled with water. When one end of the main channel is blocked, e.g., by a valve or other closure device, it is peculiarly suitable for operation from the feed end of an empty tube, as the hydrostatic force of the released water may be exploited to help propel the connector through the tube.

It should be mentioned that the closing and fastening structure at the unsectioned end 6 in the background of FIGURE 1 is a mirror image of the sectioned end of the foreground. Grooves 5 and 5' are essentially identical heights throughout the bulk of the length of thickened section 4, but at each end 6 thereof, distant groove 5' is lowered somewhat below groove 5 to bring such grooves into longitudinal registry and permit vertical interlocking of the beaded edges of the tubing.

FIGURE 3 shows the type of tubing edges preferred for use with the present invention, the crosshatching indicating a resilient material such as plastic or rubber reinforced with fibers (dots) of asbestos, glass, metal, or the like. In most joints formed by the beaded edges of the prior art, the web portions are offset with respect to each other, and the joint itself swells out from each surface of each web portion as in Madsen, U.S. Patent 2,613,421, FIGURE 4. In my FIGURE 3 joint, strips 10 and 11 remain coplanar with a single continuous inside surface, all of the swelling being on the outer surface. This makes possible a smooth sliding action of ends 3 of the connector on the inside surface of the tubing, allows a good tight seal therebetween, and insures the integrity of the gap 23 between connector and tubing.

FIGURE 2 indicates the types of grooves 5 and 5' found adequate for use with the FIGURE 1 embodiment when employing the preferred beaded edges of FIGURE 3. In operation, beaded edge 13 travels in groove 5 while beaded edge 12 travels in groove 5'. The shoulder 24 of each groove engages the corresponding shoulder 26 of the tubing edge, while diagonal surface 25 of each groove, defined by transverse member 9, contacts the corresponding edges of the ridge members to securely grip the beaded edge. FIGURE 2 shows the structure at the position indicated by lines 2—2 of FIGURE 4, and indicates that grooves 5 and 5' are somewhat displaced from each other horibontally. Similar sections taken at progressive positions to the left in FIGURE 4 would show convergence of such grooves until one is directly above the other, after which further sections would show a reduction in the thickness of crossbar member 9 until it disappeared and the two grooves 5 and 5' converged into a single groove. Sections taken further to the right in FIGURE 4 would show increasing lateral displacement of grooves 5 and 5' to follow the surface of thickened section 4 of the connector body.

FIGURE 5 illustrates an alternate method of joining and separating beaded tubing edges, in particular the type shown in FIGURE 3. The larger pair of idler rolls at the left are joining rolls, roll 31 contacting the continuous bottom surface of strips 10 and 11 and roll 32 the upper surface at the enlarged joint of the two strips with a spacing therebetween such that the ridges of each edge are firmly pressed into the grooves of the other. Upper roll 32 has a pair of flanges 33 which straddle the full width of the enlarged joint section and abut against shoulders 26 and the upper surfaces of web portions 16 and 17 of strips 10 and 11 to insure proper horizontal alignment of the beaded edges. Such flanges are not essential, but they do prevent imperfect alignments which tend to force edges 12 and 13 together in such an improper manner that the joint will open after passing through such rolls (in a left hand movement of the tubing relative to the rolls in FIGURE 5).

The pair of idler rolls at the right side of FIGURE 5 are the opening rolls, upper roll 34 slidably contacting the bottom surface of strip 11 and lower roll 35 contacting the top surface of strip 10 to force the two strips to separate. Not shown are grooves in roll 35 to accommodate the portions of strip 10 extending above the upper surface thereof, i.e., in the enlarged portion 12. Although a single roll may be used in place of both rolls 34 and 35, contact with the separated strips would tend to rotate such roll in both directions and thus would keep it from rotating at all. The use of two rolls thus has the effect of decreasing frictional drag on the tubing.

Rolls 32 and 33 may be mounted on shafts rotatably mounted in a bracket secured to the upper surface of connector body 1, and rolls 34 and 35 may be similarly mounted on another bracket. When such structure is mounted on the body 1 of the FIGURE 1 embodiment, no grooves are necessary and the only other required structure is a corresponding group of rolls at the opposite end of the sliding connector. In the alternative, grooves similar to 5 and 5' may be provided, such modified grooves terminating short of jointure at each end so that the separated tubing edges may be fed therethrough after being separated by rolls 34 and 35. As refinements, other rolls may be added, e.g., a pair of rolls to the right of 34 and 35, such added pair of rolls being flanged and grooved to fit the beaded edges 12 and 13 and also being mounted to cam such edges to pass around conduit 2.

FIGURE 6 shows a pair of guide strips which may be readily fabricated of sheet metal to accommodate the preferred type of tubing edges of FIGURE 3 and constitutes a second alternate to the grooves 5 and 5' of FIGURE 1 embodiment. Thus the right hand member 41 accommodates the right hand strip 11 of FIGURE 3 with the horizontal top panel 43 in contact with the upper surface of beaded edge 13, vertical panel 44 contacting shoulder 26, and horizontal lip 45 contacting the upper surface of web 16 and lower horizontal panel 46 contacting the lower surface of web 16. Similarly, left hand member 42 of FIGURE 6 accommodates left hand strip 10 of FIGURE 3. Vertical panel 47, of course, contacts or very nearly contacts the extremity of beaded edge 13, the near vertical surface of ridge 14.

Although it is apparent that the tubing edge guide strips of FIGURE 6 do not conform precisely to the contours of the preferred tubing edges of FIGURE 3, they have nevertheless been found practicable with the embodiments of the sliding connectors of the present invention illustrated in FIGURE 1 and 8. Where a more exacting is required, the guide strips of FIGURE 7 are more appropriate. As there indicated and as further shown in FIGURE 12, the means for securing such a fit may be made to conform very closely to the preferred tubing edges of FIGURE 3. In FIGURE 7, the right hand guide strip 51 accommodates the right hand strip 11 of FIGURE 3 so that the downwardly extending ridges 14 and 15 of the latter are accommodated in the corresponding illustrated grooves of lower panel 53, while guide strip 52 accommodates left hand strip 10 so that its upwardly extending ridges 18 and 19 fit into the illustrated grooves of upper panel 54.

It will be apparent how the guide strips of either FIGURE 6 or FIGURE 7 are used in a manner similar to the grooves 5 and 5' of the FIGURE 1 embodiment. When the tubing edges are separated, the guides 41 and 42 of FIGURE 6 (51 and 52 of FIGURE 7) may be displaced any amount consistent with proper regard for the circumference of the tubing. When a joint is to be made, the guide strips are brought together in such manner that guide strip 41 or 51 lies above its mate with their openings vertically aligned. They are then converged vertically so that their separating panels 46 and 48 (53 and 54 of FIGURE 7) merge into one, vertical panels 47 and 49 (55 and 56) being meanwhile conveniently terminated, such single separator thereafter tapering to a zero thickness.

This use of the guide strips of FIGURES 6 and 7 is illustrated in FIGURE 8, which also depicts the elbow type connector of my invention. This embodiment consists essentially of a tubular L-shaped connector or elbow 60 having a base portion 61 slidable within a tube and a transverse portion 62, such portions being integral and defining a continuous L-shaped channel. Base portion 61 terminates in the end 63 to define one end of such channel, such end being flared in the same manner as the ends 3 of the FIGURE 1 embodiment and also being in other respects analagous thereto. Guide strips 64 and 65 are secured to the surface of base portion 61 and transverse portion 62 in such manner that they join at a common end 66 to interlock beaded edges 12 and 13 of the tubing, and thereafter separate to cause a separation in the tubing edges and separate further to straddle transverse portion 62.

The deployment of guide strips 64 and 65 in use is illustrated in FIGURE 10, which shows the elbow connector 60 engaging a roll of sheet material S having the beaded edges 12 and 13 of FIGURE 3 and joining it to form a finished tube T. The guiding strips 64 and 65 of FIGURES 8 and 10 may be either 41 and 42 of FIGURE 6 or 51 and 52 of FIGURE 7, although the latter are preferable in avoiding small leaks. The unformed material S of FIGURE 10 is, of course, supported in operation on a shaft extending from the same irrigator which engages and propels the elbow connector. It will be noted that sheet material S and tubing T touch the connector only at end 63 and the guide strips, being otherwise separated therefrom by a gap G, as in the FIGURE 1 embodiment.

It will be apparent to all that the guide strips 64 and 65 of FIGURES 8 and 10 can be extended to form a mirror image of the portions thereof illustrated, i.e., so that they converge in the background as they do in the foreground. Thus they can be used to replace the grooves 5 and 5' of the FIGURE 1 embodiment or the grooves 75 and 75' of the FIGURE 11 embodiment to be described below. It will also be apparent that these guide strips may be eliminated from the FIGURE 8 and 10 embodiment and replaced by grooves similar to those of 5 and 5' of the FIGURE 1 embodiment, simply terminating such grooves at the center of the transverse section 62 (in the thickened surface, as in FIGURE 1, which must necessarily be provided unless the entire casting thickness will accommodate such grooves).

When the stiffness of the tubing sheet is of such a strength as to require something more than hand force to form the tube, the aids indicated in FIGURES 9 and 13 are useful. FIGURE 9 portrays a sort of funnel, the flat stock being fed in from the foreground and formed into a tubular but unjoined tube in the background with beaded edges 12 and 13 of FIGURE 3 held in crimped edges 91 and 92 of the funnel. When the sheet material is of greater stiffness, the tubing may be formed by the progressive rolls of FIGURE 13, in which rolls A are the end rolls of the sheet mill, forming raw sheet S, roll B gives the raw sheet its first curvature, roll C increases such curvature, rolls D (with perhaps a restraining roll) increase such curvature further, rolls E add to such effect and provide the necessary restriction and rolls F force the material into final shape.

FIGURES 11 and 12 illustrate the reducing T connector embodiment of the present invention, an embodiment particularly useful with fluid flow tubes of large diameter. It consists essentially of an arcuate body portion 71, transverse conduit portion 72 defining fluid flow channel 74 extending through body 71, and ends 73 of body portion 71. Body portion 71 contains a pair of grooves 75 and 75', the same being of such shape as to conform quite closely to the ridges and grooves of the beaded edges 12 and 13 of FIGURE 3. At ends 73, such grooves converge in the same manner as described above for grooves 5 and 5' of the FIGURE 1 embodiment to force the edges 12 and 13 into interlocking relationship. The close fit of beaded edges 12 and 13 in grooves 75 and 75' provides a tight seal which prevents leakage of fluid through the grooves and provides more surface friction to resist hoop stress in the tubing.

While the grooves 75 and 75' are shown as designed to fit the tubing edges of the FIGURE 3 embodiment, it is to be noted that there is no compelling reason for using such type beaded edges, as there is no particularly desirable reason for obtaining a smooth inside tubing surface at the joint, as is desirable in sliding the flared ends of the FIGURES 10 and 8 embodiments through the tubing in sealing relationship. Other tubing edges may be used, and grooves 74 and 74' designed to fit such edges closely.

FIGURE 14 illustrates an auxiliary device which may be used with either the FIGURE 1 T connector or the FIGURE 11 reducing T connector to replace the rabbetted or cast grooves thereof. The device is shown in plan, and includes a tubular arcuate body 81, opened as indicated to define a gap 82 converging from a maximum width at the center until it disappears near each end 83. Such gap 82 is defined by a pair of guide strips 84 and 84', such strips either being either of the forms shown in FIGURES 6 and 7, or some intermediate form, e.g., guide strips defining the configurations of grooves 5 and 5' of FIGURE 2. They are, of course, secured to or formed on body 81 so that one strip 84 approaches either end 83 from above the corresponding strip 84', the pair of grooves converging vertically until the transverse panels separating them join as one and such single transverse panel is thereafter tapered until it disappears and a single groove is defined by the joined strips, as described above in connection with FIGURES 6 and 7. When so disposed and used with the preferred type of tubing edges of FIGURE 3, guide strip 84 contains beaded edge 13 and is the equivalent of groove 5 of FIGURES 1, 2 and 4, groove 75 of FIGURES 11 and 12, guide strip 41 of FIGURE 6 or guide strip 51 of FIGURE 7, while strip 84' is the corresponding equivalent of groove 5', groove 75', guide strip 42 or guide strip 52. Guide strips 84 may be formed from the edges of body 81 by bending, or may be preformed separately and secured to body 81 so that, e.g., the horizontal bottom panels 46 and 50 of guide strips 41 and 42 lie on and conform to the surface of body 81 at the edges thereof defining gap 82.

When used with the FIGURE 1 embodiment, the auxiliary device of FIGURE 14 may be a full tube, as shown, having an inside diameter essentially equal to the outside diameter of body portion 1. The thickened wall portion 4 of the body may be reduced to the thickness of the main body portion 1. The maximum width of gap 82 is, of course, made sufficiently large as to accommodate the transverse conduit portion 2 of the T connector, and the assembly is completed by securing body 81 to body 1 so that conduit 2 juts up through gap 82. The auxiliary device of FIGURE 14 may, of course, be less than a full tube in circumference, so long as sufficient support is furnished for guide strips 84 and 84'. This type of construction has the advantage that the auxiliary device may be separately made and easily slipped over the modified T connector.

It should be noted here that the FIGURE 1 embodiment, when modified as indicated so that all of body portion 1 has a single wall thickness, may be equipped with the guide strips of FIGURES 6 or 7 in the same manner as in FIGURES 8 and 10 except that such strips are continued to join at each end.

When used with the reducing T connector of FIGURE 11, the auxiliary guide strip device of FIGURE 14 need not be a complete tube in circumference, and it is indeed preferable that it be only a portion thereof. It is disposed so that guide strips 84 and 84' are disposed on and secured to the upper surface of body 71 in leaktight relationship, grooves 75 and 75' being eliminated as unnecessary. The preferred types of guide strips, when using the tubing edges of FIGURE 3, are those of FIGURE 7—for the tighter seal and better grip.

The described embodiments of my invention may be used to distribute water at very high pressures, said pressures being limited only by the bursting pressure of the tubing employed. The body portions are easily moved through 4-inch tubes by hand, and can indeed be used by coupling the transverse conduit member to a short length of hose terminating in a nozzle and carrying such attachment by hand, such method being particularly useful when a high pressure is maintained in the tubing.

Many modifications of my invention are possible, e.g., the transverse conduit portion need not be normal to the body portion as shown, but may extend therefrom at various angles. I am also aware that my sliding connectors may be put to uses unrelated to the distribution of fluids, and have a general utility where it is desired to open and close tubing with some materials in the tubing extending to the outside. Therefore I desire to be limited only as indicated in the following claims.

What I claim as my invention is:

1. A sliding connector adapted to close and open a tube of resilient material formed from a sheet having a minor thickness or web portion and a pair of parallel beaded edges of greater thickness, each said edge consisting of alternate ridges and grooves so disposed that said tube edges may be forced into interlocking and sealing relationship, comprising an elongated body portion slidable in sealing relationship with said resilient tubing and a lateral conduit portion integrally joined thereto, said body portion having two ends and defining a first flow channel and said lateral portion defining a second flow channel extending into said body portion and connecting with said first channel, said connector containing in its surface a system of grooves extending toward at least one end thereof, said groove system commencing with a single groove between said end and said lateral portion and having dimensions to accommodate said beaded edges in interlocked relationship and a pair of narrow, oppositely disposed lateral slits to accommodate said web of said tubing, said single groove thereafter diverging vertically to accommodate said tubing edges in separate relationship, said single groove thereafter diverging vertically into two separate grooves each of dimensions to accommodate and restrain one of said beaded edges, said separated grooves thereafter diverging laterally to span said lateral member, each of said separated grooves having a lateral slit to accommodate said web and extending at least to said lateral member.

2. The sliding connector of claim 1 in which said body portion is a plate of smaller width than length, said width also being small in comparison with the circumference of the resilient tube with which it is to be used, said lateral portion is located between the ends of said plate and said groove system includes a said single groove and a pair of said separate grooves at each end of said plate, the individual grooves of one pair meeting the individual grooves of the other pair at said lateral portion, all of said grooves conforming sufficiently to the contours of said tubing edges to prevent leakage therearound.

3. The sliding connector of claim 1 in which said body portion is tubular, said first flow channel has two open ends, said lateral portion joins said body portion between said open ends, said groove system includes a said single groove and a pair of said separate grooves between each open end and said lateral portion, said pairs of separate grooves meeting at said lateral portion to define a single pair of grooves extending from one said single groove to the other, and a flared end portion at each open end of said first flow channel, said flared ends having a maximum diameter and sufficient resiliency to provide a seal between said end and said tubing.

4. The sliding connector of claim 1 in which said body portion is tubular, said first flow channel has only one open end, said lateral portion joins said body portion at the other end of said first flow channel to define an elbow connector defining an L-shaped channel one leg of which is coaxial with said resilient tubing and the other is transverse thereto, said two separate grooves terminate at said lateral portion, and said connector includes a flared end portion at said open end of said first flow channel, said flared end portion having a maximum diameter and sufficient resiliency to provide a seal between said end of said first flow channel and said tubing.

5. A sliding fluid connector adapted to close and open a tube of resilient material formed from sheet material having a minor thickness or web portion over most of its width and a pair of parallel beaded edges of greater thickness, each said edge consisting of alternate ridge and groove parts so disposed that said tube edges may be forced into an interlocking relationship in which the inner surface of the joined edges forms a continuous surface coplanar with the inner surface of said web and the outer surface extends above the outer surface of said web to provide a shoulder between each said beaded edge and said web, said fluid connector comprising a hollow tube body portion slidable in sealing relationship with said resilient tube and a lateral hollow tube portion integrally joined to said body portion in sealing relationship, said body portion having at least one open end removed from said joint, said portions defining intersecting fluid flow channels, and a system of grooves in the outer surface of said connector to accommodate said beaded edges of said tube, said groove system commencing with a single groove between said open end of said body portion and said lateral portion and having dimensions sufficient to accommodate and restrain said beaded edges in interlocked relationship and a pair of narrow lateral slits to accommodate said webs of said material, said single groove thereafter diverging vertically to define a larger groove to accommodate said tubing edges in separated relationship, said larger groove thereafter diverging vertically into a pair of separate grooves to separate said beaded edges, said pair of grooves thereafter diverging laterally to span said lateral member, each of said pair of grooves having a section including a shoulder to hold said beaded edge and a lateral slit for said web portion of said groove, said groove system extending to at least said lateral portion.

6. The sliding connector of claim 5 which includes a flared end portion at said at least one open end, said flared end portion being of maximum diameter and resiliency to provide a seal between said at least one open end and said resilient tubing, and said groove system is disposed so that there is frictional contact between said tubing and said connector only at said flared end portion and in said groove system.

7. The sliding connector of claim 6 in which said connector is provided with a thickened wall portion in the area of the joint between said body portion and said lateral portion, and said groove system is disposed in said thickened wall portion.

8. The sliding connector of claim 6 in which said connector includes a guide strip structure defining said groove system, said guide strip structure being integrally secured to said connector.

9. The sliding connector of claim 6 in which said body portion has two open ends, said joint with said lateral portion is disposed between said open ends, said groove system includes a said single groove between each open end and said lateral portion, each said single groove diverging into a said pair of separated grooves spanning and meeting at said lateral member, and each said open end is flared to provide a seal with said resilient tubing.

10. The sliding connector of claim 6 in which said lateral portion and said body portion are joined to define an L-shaped channel, one leg of which is coaxial with said resilient tubing and the other is lateral thereto, and said pair of single grooves terminates at said lateral portion of said connector.

11. A method of simultaneously forming a fluid distribution tube and distributing fluid therefrom, comprising attaching the lateral portion of the sliding connector of claim 10 to the input side of an irrigator, feeding the beaded edges of a roll of resilient tubing material through the groove system of said connector to form a short starting section of said tube, said roll of tubing material being mounted on an arm extending from said irrigator with its width transverse to the axis of said tube, and simultaneously supplying fluid to the formed end of said tube and propelling said irrigator along said axis of said tube.

References Cited in the file of this patent

UNITED STATES PATENTS

| | | |
|---|---|---|
| 2,496,209 | Hemming | Jan. 31, 1950 |
| 2,747,932 | Volk | May 29, 1956 |
| 2,789,506 | Baker | July 9, 1957 |